United States Patent
Pistorius et al.

(10) Patent No.: US 10,343,289 B2
(45) Date of Patent: Jul. 9, 2019

(54) VERIFICATION SYSTEM FOR MANUFACTURING PROCESSES

(71) Applicant: The Boeing Company, Chicago, IL (US)

(72) Inventors: John Matthew Pistorius, Mount Pleasant, SC (US); Michael Bodach, Daniel Island, SC (US); Jonathan Fulton, Mount Pleasant, SC (US); Shibin Mathew, Ladson, SC (US); Nathan Lee Petty, Summerville, SC (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 15/588,448

(22) Filed: May 5, 2017

(65) Prior Publication Data

US 2018/0321671 A1    Nov. 8, 2018

(51) Int. Cl.
| | |
|---|---|
| *G06F 19/00* | (2018.01) |
| *B25J 15/00* | (2006.01) |
| *B25J 11/00* | (2006.01) |
| *G05B 19/4068* | (2006.01) |
| *G05B 19/409* | (2006.01) |
| *G05B 19/418* | (2006.01) |
| *G06K 7/14* | (2006.01) |
| *G06K 7/10* | (2006.01) |

(52) U.S. Cl.
CPC ......... *B25J 15/0019* (2013.01); *B25J 11/005* (2013.01); *G05B 19/409* (2013.01); *G05B 19/4068* (2013.01); *G05B 19/4183* (2013.01); *G06K 7/10297* (2013.01); *G06K 7/1413* (2013.01); *Y10S 901/41* (2013.01)

(58) Field of Classification Search
CPC ................................................. G05B 19/41875
USPC ........................................................... 700/110
See application file for complete search history.

(56) References Cited

U.S. PATENT DOCUMENTS

| | | | | |
|---|---|---|---|---|
| 4,912,625 | A * | 3/1990 | Glatfelter | G05B 19/4068 700/184 |
| 8,612,200 | B2 * | 12/2013 | Wang | G05B 19/054 700/95 |
| 10,095,202 | B2 * | 10/2018 | Maturana | G05B 15/02 |
| 2007/0109729 | A1 * | 5/2007 | Fujii | H02K 7/06 361/600 |
| 2007/0299642 | A1 * | 12/2007 | Kondo | G06F 17/5009 703/6 |
| 2014/0196134 | A1 * | 7/2014 | Yamaguchi | G06F 21/44 726/7 |

(Continued)

OTHER PUBLICATIONS

Edward Simpson, Manufacturing Process Verification Versus Validation: Which Do You Need?, Jan. 23, 2015, Labcompare.com, pp. 2 (Year: 2015).*

(Continued)

*Primary Examiner* — Suresh Suryawanshi
(74) *Attorney, Agent, or Firm* — Kolisch Hartwell, P.C.

(57) ABSTRACT

Systems, methods, and software products that provide enhanced efficiency in automated and semi-automated manufacturing processes by employing process intelligence to verify that a user-selected manufacturing process to be applied to a workpiece corresponds to the manufacturing process actually designated for that workpiece, thereby avoiding potentially costly manufacturing errors.

19 Claims, 3 Drawing Sheets

(56) References Cited

U.S. PATENT DOCUMENTS

| | | | | |
|---|---|---|---|---|
| 2015/0261899 A1* | 9/2015 | Atohira | ............... | G06F 17/5009 |
| | | | | 703/7 |
| 2015/0277406 A1* | 10/2015 | Maturana | ........... | G05B 19/0423 |
| | | | | 700/83 |
| 2017/0235297 A1 | 8/2017 | Salour et al. | | |

OTHER PUBLICATIONS

Ko et al, The Template Model Approach for PLC Simulation in an Automotive Industry, 2011, Department of Industrial Engineering University of Ajou Suwon, Korea, pp. 7 (Year: 2011).*

El Ghazali et al., The Potential of RFID as an Enabler of Knowledge Management and Collaboration for the Procurement Cycle in the Construction Industry, Journal of Technology Management & Innovation vol. 7 No. 4, 2012, 26 pages.

Association for Automatic Identification and Mobile Data Capture, RFiD or "Smart Labels", URL: http://www.alliancegroup.co.uk/rfid.htm, circa before Nov. 20, 2015, 4 pages.

\* cited by examiner

VERIFICATION SYSTEM FOR MANUFACTURING PROCESSES

FIELD

This disclosure relates to systems for managing manufacturing processes, and more specifically to systems and methods for validating the control programs used by robotic manufacturing apparatus.

BACKGROUND

The advent of industrial automation and computerization has resulted in increased manufacturing efficiency and productivity, but also created previously unknown problems in production workflow and process validation. For example, the high throughput and complexity of many modern manufacturing processes, particularly those that include computer numerical control (CNC) systems, may sometimes result in the inadvertent selection of an incorrect command sequence for a piece of computer-controlled machinery.

As a result of such an error, a workpiece or sub-assembly that may have been the result of dozens of previous manufacturing and/or assembly steps may be accidentally ruined by an inappropriate and undesired machining process, at a potential loss of thousands or even millions of dollars.

What is needed is a system that provides verification for such automated manufacturing processes and prevents such costly errors.

SUMMARY

The present disclosure provides manufacturing systems, methods, and computer program products for validating the control program for manufacturing apparatus.

In some aspects, the disclosure may provide manufacturing systems that include a manufacturing apparatus that is configured to perform a manufacturing process on a workpiece in a workspace. The system may further include a scanner that can identify the workpiece in the workspace, a robotic controller that controls the manufacturing apparatus to perform the desired manufacturing process by executing a corresponding control program, and a user interface that permits a user of the manufacturing apparatus to identify, from a plurality of control programs, a desired control program for execution by the robotic controller. The system may further include a process controller that is in communication with the robotic controller, the user interface, a data server that contains a plurality of control programs, and a manufacturing database that contains a plurality of work orders. The process controller may be configured to receive the identification of the user-identified control program, identify the workpiece in the workspace using the scanner, retrieve a work order for the identified workpiece from the manufacturing database that specifies a designated control program for the appropriate manufacturing process for the identified workpiece, and then validate whether or not the desired control program matches the designated control program.

In some aspects, the disclosure may provide methods of validating a control program for a manufacturing apparatus, where the method may include receiving at a process controller a user-input of an identification of a desired control program for the robotic controller of a manufacturing apparatus; receiving at the process controller an identification of a workpiece positioned within a workspace of the manufacturing apparatus; retrieving by the process controller from a database containing a plurality of work orders a work order for the identified workpiece that specifies a designated control program for an appropriate manufacturing process; and validating by the process controller whether or not the desired control program matches the designated control program.

In some aspects, the disclosure may provide a computer program product, where the computer program product may include at least one computer readable storage medium having computer readable program instructions embodied therewith, such that the computer readable program instructions, when read by a processor, are configured to receive a user-input of an identification of a desired control program for a robotic controller of a manufacturing apparatus, receive a scanner input of an identification of a workpiece positioned within a workspace of the manufacturing apparatus, retrieve from a database containing a plurality of work orders the work order for the identified workpiece that designates the control program for an appropriate manufacturing process, determine whether or not the desired control program matches the designated control program, and responsive to a match generate an output for transmitting the desired control program to the robotic controller for execution and thereby cause the robotic controller to control the manufacturing apparatus to perform the desired manufacturing process on the identified workpiece.

The features, functions, and advantages may be achieved independently in various aspects of the present disclosure, or may be combined in yet other aspects further details of which can be seen with reference to the following description and drawings.

DESCRIPTION

Figure 1:
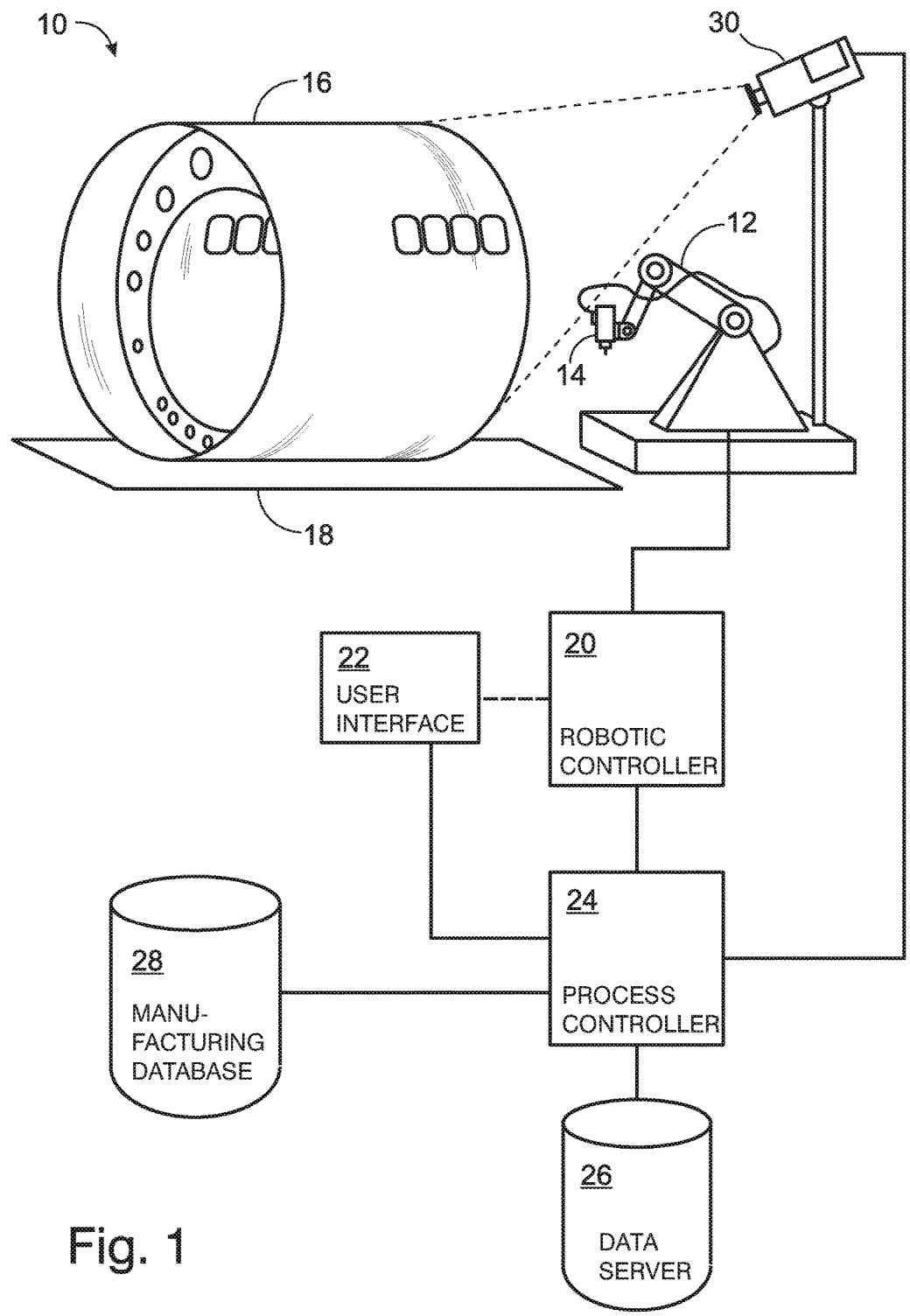
FIG. 1 is a semi-schematic depiction of a manufacturing system, according to an aspect of the present disclosure.

The systems, methods, and software products of the present disclosure may help provide enhanced efficiency in automated and semi-automated manufacturing processes by employing process intelligence to verify that a user-selected manufacturing process to be applied to a workpiece corresponds to the manufacturing process designated for that workpiece, thereby avoiding potentially costly manufacturing errors.

Various embodiments of manufacturing systems and manufacturing methods and processes having one or more such advantageous properties are described below and illustrated in the associated drawings. Unless otherwise specified, the disclosed systems and methods may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be combined with and/or incorporated into other similar or related manufacturing processes. The following description of various examples is merely exemplary in nature and is in no way intended to limit the disclosure, its application, or uses. Additionally, the advantages provided by the examples, as described below, are illustrative in nature and not all examples may provide the same advantages or the same degree of advantages.

In modern manufacturing facilities, an individual workpiece may be routed to one or more workstations during processing. As used herein, a workpiece may refer to any of a piece of material, an intermediate, or a sub-assembly that is intended to be, or is in the process of being, cut, shaped, or otherwise machined as part of a manufacturing process.

Despite the increasing adoption of CNC machinery, robotics, and other automated systems, there remains a potential for a user to simply select an inappropriate machining program. Even sophisticated CNC machinery may not be configured to consider the overall manufacturing process of a given part, and how far along that process the part may be. Additionally, if multiple CNC apparatus are required to complete a given part, any individual apparatus may not be configured to make a determination of whether a currently selected machining program is the appropriate machining program for a given workpiece, or for the current status of a given workpiece.

Although the machinery operator may serve as a check that a selected machining process is the correct one, reliance on purely human systems leaves the process vulnerable to human error. And the potential consequences of implementing the incorrect machining process on a part range from the merely inconvenient to the very costly. Considering an example from the commercial aircraft industry, once a complex sub-assembly has been manufactured, such as for example a barrel section for an aircraft fuselage, performing an inappropriate drilling process on the sub-assembly may result in the complete loss of that part, resulting in the waste of hundreds, thousands, even millions of dollars in some cases.

By implementing a manufacturing system that employs process intelligence, the selection by an operator of a manufacturing process to be applied to a workpiece can be verified as corresponding to the manufacturing process that is actually correct and appropriate for that workpiece, eliminating the potential of human error and its associated costs.

An exemplary manufacturing system 10 of the present disclosure is depicted semi-schematically in FIG. 1. Manufacturing system 10 may include a manufacturing apparatus 12 that is configured to perform a one or more machining processes using attached tooling 14. Tooling 14 may include any suitable type of tooling, or combination of tooling, including drills, mills, lathes, plasma cutters, water jet cutters, electric discharge heads, and welding heads, among many others.

Manufacturing apparatus 12 may include a defined workspace 16 associated with the apparatus. Workspace 16 may typically include an area of space that tooling 14 is capable of accessing when manipulated by apparatus 12. Workspace 16 may additionally or alternatively include an area of space within which a desired workpiece 18 is placed in order to be accessible to tooling 14 of manufacturing apparatus 12.

Manufacturing system 10 may include a robotic controller 20 that is configured to control manufacturing apparatus 12 and specifically the operation of tooling 14. Robotic controller 20 is configured to execute one or more discrete machining processes upon the execution of an appropriate control program, as may be selected by a user via a user interface 22. User interface 22 is configured to permit a user to identify, from a plurality of available control programs, a desired control program for execution by the robotic controller 20.

A control program may, for example, include a spatial definition of the intended workpiece, and a spatial definition of the associated tooling 14. The control program includes a preprogrammed series of tooling movement along a defined three-dimensional path that is calculated so that execution of the control program by robotic controller 20 will result in manufacturing apparatus 12 performing one or more desired machining tasks on a particular workpiece.

For the purposes of illustration, workpiece 18 of FIG. 1 is depicted as a barrel section of an aircraft fuselage, and is representative of a manufacturing subassembly that reflects a significant investment in materials, technology, and time. It should be appreciated that if robotic controller 20 were to execute an inappropriate control program, manufacturing apparatus 12 might then execute an inappropriate machining process. That is, an operator or user selection of an inappropriate control program might result in the investment represented by workpiece 18 being lost.

Although the present example is disclosed as useful in the context of aircraft manufacture, the systems and methods disclosed herein may have utility in any suitable application and appropriate environment, without limitation, and may be particularly useful wherever a significant investment in materials and/or time have made the potential consequences of an error prohibitive.

As shown in FIG. 1, user interface 22 is in communication with a process controller 24. The communication may be via a direct connection, or user interface 22 may be coupled to process controller 24 via an indirect connection, such as where user interface 22 is directly linked to robotic controller 20, which is itself in communication with process controller 24. The disclosed manufacturing system 10 need not limited to any particular process controller for carrying out the disclosed manufacturing processes, and a wide variety of industrial process controllers suitable for use in the disclosed systems are commercially available. As used herein, "process controller" is intended to denote any machine or instrument capable of performing the calculations, or computations, necessary to perform the tasks of the disclosed systems and methods. The term "process controller" is intended to denote any machine or instrument that is capable of accepting a structured input and of processing the input in accordance with prescribed rules to produce an output.

Process controller 24 is additionally in communication with a data server 26 on which is stored a plurality of individual control programs. Data server 26 may be accessible via a direct connection, via a local area network, a wide area network, or the Internet. Data server 26 may store a plurality of control programs suitable for execution by robotic controller 20 to operate manufacturing apparatus 12. Data server 26 may optionally store one or more additional control programs configured for execution by alternative robotic controllers and/or alternative manufacturing apparatus, without limitation. In one aspect of the disclosure, data server 26 may serve as a repository for some or all of the control programs required for a given manufacturing apparatus, a given manufacturing facility, or a given manufacturer, without limitation.

Process controller 24 is additionally in communication with a manufacturing database 28 on which is stored a plurality of manufacturing records. Manufacturing database 28 may be accessible to process controller 24 via a direct connection, via a local area network, a wide area network, or the Internet. Manufacturing database 28 may include any type of manufacturing records, but in particular may include records associated with individual workpieces, such as a work order.

As used herein, a work order is an electronic record that includes an identification of a particular workpiece, an identification of one or more manufacturing steps to be carried out on that workpiece, and an identification of the specific manufacturing apparatus where the one or more manufacturing steps should be carried out on that workpiece, among other data. A given work order may include a designation of multiple individual manufacturing steps intended to be carried out on that workpiece using one or more manufacturing apparatus. As part of the designation of a manufacturing step, a given work order may include a designation of a control program corresponding to an intended manufacturing step to be performed on an intended manufacturing apparatus upon execution by an associated robotic controller.

Process controller 24 is additionally in communication with a scanner 30 that is configured to identify workpiece 18 when the workpiece is disposed within workspace 16. Scanner 30 may be connection to process controller 24 via a direct connection, via a local area network, a wide area network, or the Internet.

Although scanner 30 is depicted generically in FIG. 1 as a type of camera, it should be appreciated that any type of scanner and identification technology capable of providing a useful identification of an individual workpiece may be a useful technology for the purposes of this disclosure, and scanner 30 may be or incorporate any such scanner technology.

In one aspect of the disclosed system, each workpiece 18 includes an identification tag. The identification tag may, for example, incorporate an optical code, such as a barcode, or QR code. Where workpiece 18 includes an optical code, scanner 30 may be or incorporate a barcode scanner that is configured to scan the optical code and transmit the identity of the workpiece to process controller 24.

In an alternative aspect of the disclosed system, each workpiece 18 may include a radio-frequency identification (RFID) chip and its associated antenna, and scanner 30 may be or incorporate an RFID scanner that is configured to energizes such an RFID chip when it is proximate to scanner 30 via the antenna associated with that RFID chip. The energized RFID chip may then respond by transmitting a signal that includes an identifying code.

In yet another additional or alternative aspect of the disclosed system, scanner 30 may incorporate a camera that is configured to capture an image of workpiece 18 when it is disposed within workspace 16, and the image may then be analyzed using image recognition software by process controller 24 or some other processor. Such image recognition analysis may be used to identify workpiece 18 by virtue of its configuration. That is, the image recognition analysis may be used to confirm whether the workpiece 18 has one or more of the size, shape, and configuration of a workpiece that would be an appropriate workpiece for the manufacturing process carried out by manufacturing apparatus 12.

The exemplary manufacturing system 10 of FIG. 1 is configured to carry out a process verification, which includes a user of manufacturing apparatus 12 identifying via user interface 22 a desired control program for execution by robotic controller 20 in order to carry out a manufacturing process using manufacturing apparatus 12. The user may enter an identifier of the desired control program, or may select a specific control program from a plurality of available control programs.

Process controller 24 receives an identification from user interface 22 of the user-identified control program. Responsive to receiving the identification of the desired control program, process controller 24 then utilizes scanner 30 to identify workpiece 18, as discussed above. Once process controller 24 receives an identification of workpiece 18, process controller then retrieves a corresponding work order for identified workpiece 18 from manufacturing database 28, where the work order specifies at least a specific control program designated for workpiece 18 by the work order, where the designated control program corresponds to the appropriate manufacturing process for identified workpiece 18.

Having received the identity of the control program previously designated for workpiece 18, process controller 24 then compares the desired (or selected) control program identified by the user with the control program designated by the work order in order to validate whether the desired control program is appropriate for workpiece 18.

In one aspect of the disclosed systems and methods, the process controller determines that the user-selected control program matches the control program designated in the appropriate work order. In this case, process controller 24 validates the user selection of the desired control program, and then transmits the particular desired (and designated) control program to robotic controller 20 for execution.

In an alternative aspect of the disclosed systems and methods, the process controller determines that the user-selected control program fails to match the control program designated in the appropriate work order. In this case, process controller 24 may be configured to prevent execution of the desired but incorrect control program. For example, process controller 24 may simply fail to transmit the desired control program to robotic controller 20, leaving robotic controller 20 unable to proceed with the selected manufacturing process. Alternatively, or in addition, process controller 24 may provide an alert to the user that the desired (or selected) control program is incorrect for workpiece 18. The alert may take any suitable form, from a simple text readout on user interface 22 to any of a variety of attention-getting combinations of flashing lights and audible alarms.

The systems disclosed herein for carrying out the presently disclosed verification methods, including but not limited to the robotic controllers for individual machining apparatus, and the disclosed process controller that carries out verification, may include suitable data processing systems, which may further include a communications framework to provide communications between workstations, control systems, processor units, memory, persistent storage, communications units, input/output (I/O) units, and displays.

Instructions for appropriate operating systems, applications, and/or programs may be located in one or more storage devices in communication with the one or more processor units through a communications framework. The instructions may be in a functional form on a persistent storage. These instructions may be loaded into a memory for execution by a processor unit.

These instructions may be referred to as program instructions, program code, computer usable program code, or computer readable program code that may be read and executed by a processor. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out aspects of the present disclosure may be written in one or any combination of programming languages, including an object-oriented programming language such as Java, Smalltalk, C++, and/or the like, and conventional procedural programming languages, such as the C programming language. Similarly, useful CNC control programs may employ any variety of G-code or G programming languages, or other appropriate language for computerized machine tooling. Appropriate code may be obtained, for example, from the CATIA software application for computer-aided design and manufacturing, or other suitable software application.

The relevant program code for the present systems and methods may execute entirely on a given process controller, entirely on a user's computer, partly on a process controller and partly on a user's computer, as a stand-alone software package, partly on a process controller and partly on a remote computer, or entirely on a remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The relevant computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/ acts specified in the present disclosure, for example as embodied by flowcharts and/or block diagram block or blocks.

EXAMPLES, COMPONENTS, AND ALTERNATIVES

The following examples describe selected aspects of the systems and methods of the present disclosure. These examples are intended for illustration and should not be interpreted as limiting the entire scope of the present disclosure. Each example may include one or more distinct aspects of the disclosure, and/or contextual or related information, function, and/or structure.

Example 1

Figure 2:
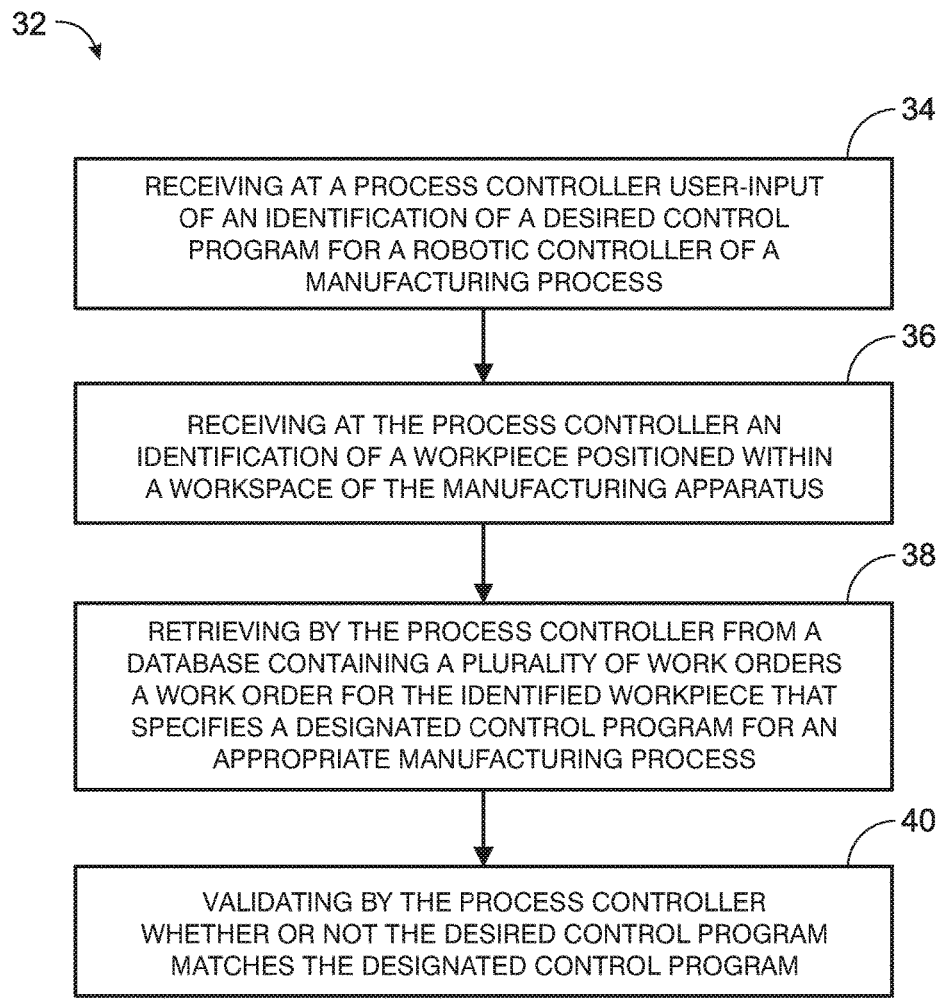
FIG. 2 is a flowchart illustrating a method of validating a control program for a manufacturing apparatus, according to an aspect of the present disclosure.

FIG. 2 illustrates a flowchart 32 of an illustrative method of validating a control program for a manufacturing apparatus. The method may include receiving at a process controller user-input of an identification of a desired control program for a robotic controller of a manufacturing process at 34 of flowchart 32. The identification of a workpiece positioned within a workspace of the manufacturing apparatus may be received at the process controller, at 36 of flowchart 32. A work order for the identified workpiece that specifies a designated control program for an appropriate manufacturing process may be retrieving by the process controller from a database containing a plurality of work orders, at 38 of flowchart 32. And the process controller may validate whether or not the desired control program matches the designated control program, at 40 of flowchart 32.

Example 2

Figure 3:
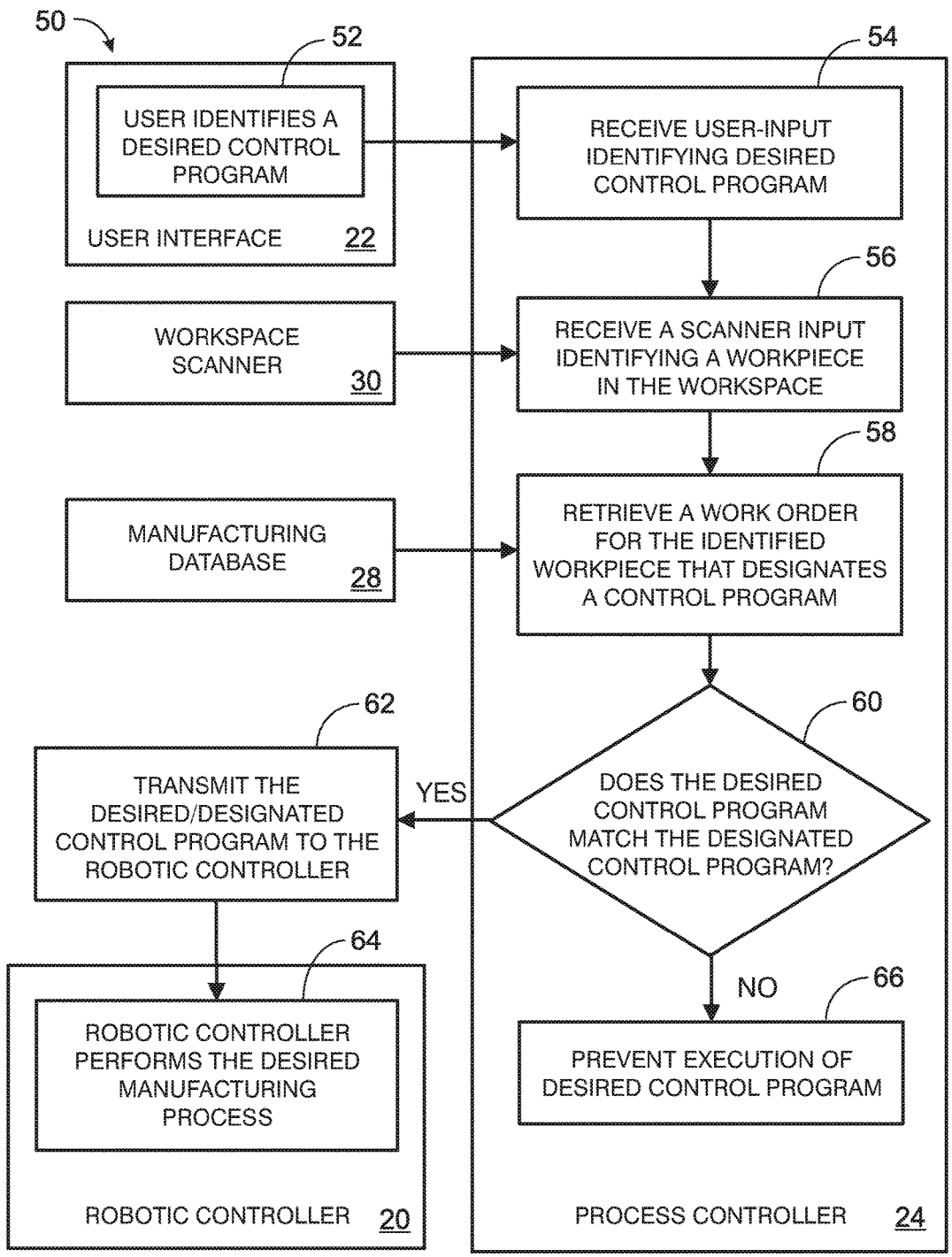
FIG. 3 is a flowchart illustrating the function of a system, including a computer program product, according to an aspect of the present disclosure.

FIG. 3 illustrates an alternative flowchart 50 of an illustrative method of validating a control program for a manufacturing apparatus according to the present disclosure. As shown in flowchart 50, a user may identify a desired control program using user interface 22, as shown at 52. The user-input identifying the desired control program may then be received by process controller 24, as shown at 54. The process controller may then receive a scanner input from scanner 30 that identifies the workpiece disposed in the relevant workspace, as shown at 56. The process controller 24 may then retrieve a work order designating a control program from manufacturing database 28, as shown at 58. The process controller 24 may then determine whether the desired control program matches the designated control program, as shown at 60. Where the desired control program matches the designated control program, the desired and/or designated control program may then be transmitted to the robotic controller 20, as shown at 62. The robotic controller 20 may then perform the desired manufacturing process by executing the desired and/or designated control program, as shown at 64. Where the desired control program fails to match the designated control program, the process controller 24 may then prevent execution of the desired control program, as shown at 66.

Example 3

This section describes additional aspects and features of the systems and methods of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A manufacturing system, comprising:
a manufacturing apparatus configured to perform a manufacturing process on a workpiece in a workspace;
a scanner configured to identify the workpiece in the workspace;
a robotic controller configured to control the manufacturing apparatus to perform a desired manufacturing process by executing a corresponding control program;
a user interface configured to permit a user to identify, from a plurality of control programs, a desired control program for execution by the robotic controller;
a process controller that is in communication with the robotic controller, the user interface, a data server that contains a plurality of control programs, and a manufacturing database that contains a plurality of work orders;
wherein the process controller is configured to:
receive the identification of the user-identified control program;
identify the workpiece in the workspace using the scanner;
retrieve a work order for the identified workpiece from the manufacturing database that specifies a designated control program for an appropriate manufacturing process for the identified workpiece; and
validate whether or not the desired control program matches the designated control program.

A2. The manufacturing system of paragraph A1, wherein the process controller is further configured so that if the desired control program does not match the designated control program, the process controller prevents execution of the desired control program and provides an alert to the user that the desired control program is incorrect.

A3. The manufacturing system of paragraph A1, wherein the process controller is further configured so that if the desired control program matches the designated control program, the process controller sends the desired control program to the robotic controller for execution.

A4. The manufacturing system of paragraph A1, wherein the scanner includes one or more of a camera, a barcode scanner, and an RFID scanner that is configured to detect identifying indicia associated with the workpiece positioned in the workspace.

A5. The manufacturing system of paragraph A4, wherein the process controller is further configured to receive the detected identifying indicia and correlate the indicia with the identity of the workpiece.

A6. The manufacturing system of paragraph A5, wherein the scanner is a camera configured to capture image data of the workpiece, and the process controller is configured correlate the image data with the identity of the workpiece using image recognition.

A7. The manufacturing system of paragraph A5, wherein the scanner is an RFID scanner, and the RFID scanner is configured to detect an RFID tag associated with the workpiece, and the process controller is configured to correlate the RFID tag with the identity of the workpiece.

A8. The manufacturing system of paragraph A5, wherein the scanner is a barcode scanner, and the barcode scanner is configured to read a barcode associated with the workpiece, and the process controller is configured to correlate the barcode with the identity of the workpiece.

A9. The manufacturing system of paragraph A1, wherein the user interface is associated with the robotic controller.

B1. A method for validating a control program for a manufacturing apparatus, comprising:
receiving at a process controller user-input of an identification of a desired control program for a robotic controller of a manufacturing apparatus;
receiving at the process controller an identification of a workpiece positioned within a workspace of the manufacturing apparatus;
retrieving by the process controller from a database containing a plurality of work orders a work order for the identified workpiece that specifies a designated control program for an appropriate manufacturing process; and
validating by the process controller whether or not the desired control program matches the designated control program.

B2. The method of paragraph B1, wherein when the desired control program does not match the designated control program, the method further comprises preventing an execution of the desired control program.

B3. The method of paragraph B2, further comprising providing an alert to a user that the desired control program is incorrect.

B4. The method of paragraph B3, wherein providing the alert includes generating a notification that the identified workpiece is at an inappropriate manufacturing apparatus, generating a notification that the desired control program is an inappropriate control program for the identified workpiece, and providing an identification of the designated control program for the identified workpiece.

B5. The method of paragraph B1, wherein validating whether or not the desired control program matches the designated control program includes retrieving by the process controller the desired control program from a remote data server and comparing the desired control program with the designated control program.

B6. The method of paragraph B1, wherein receiving an identification of a workpiece positioned within the workspace of the manufacturing apparatus includes detecting and interpreting an identifying indicium associated with the workpiece.

B7. The method of paragraph B6, wherein detecting the identifying indicia includes one or more of capturing an image of the workpiece using a camera, detecting an RFID tag using an RFID scanner; and reading a barcode using a barcode scanner.

C1. A computer program product, comprising:
at least one computer readable storage medium having computer readable program instructions embodied therewith, the computer readable program instructions, when read by a processor, being configured to:
receive user-input of an identification of a desired control program for a robotic controller of a manufacturing apparatus;
receive a scanner input of an identification of a workpiece positioned within a workspace of the manufacturing apparatus;
retrieve from a database containing a plurality of work orders a work order for the identified workpiece that designates a control program for an appropriate manufacturing process; and
determine whether or not the desired control program matches the designated control program, and responsive to a match generate an output for transmitting the desired control program to the robotic controller for execution, to thereby cause the robotic controller to control the manufacturing apparatus to perform a desired manufacturing process on the identified workpiece.

C2. The computer program product of paragraph C1, wherein the computer readable program instructions, when read by the processor are further configured to prevent an execution of the desired control program when the desired control program fails to match the designated control program.

C3. The computer program product of paragraph C2, wherein the computer readable program instructions, when read by the processor are further configured to provide an alert that the desired control program is incorrect.

C4. The computer program product of paragraph C1, wherein the computer readable program instructions, when read by the processor are further configured to transmit the desired control program to the robotic controller for execution.

Advantages, Features, Benefits

The presently disclosed systems and methods include the implementation of process intelligence to assist in the prevention of manufacturing errors where manufacture is performed in whole or in part by computer-controlled machinery. By providing an automated verification of a selected industrial machining process, potentially costly manufacturing errors may be avoided, with concomitant savings in material and worker-hours. The disclosed systems may intelligently ensure that only the correct materials, tools, and machine programs are used in a defined manufacturing step, and this verification may occur in real time, further enhancing the effectiveness of and high reliability of the disclosed systems.

CONCLUSION

The disclosure set forth above may encompass multiple distinct disclosures with independent utility. Although each of these disclosures has been set out in its preferred form(s), the specific examples thereof as disclosed and illustrated herein are not to be considered in a limiting sense, because numerous variations are possible. The subject matter of the disclosure includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the present disclosure.

What is claimed is:

1. A manufacturing system, comprising:
   a manufacturing apparatus configured to perform a manufacturing process on a workpiece in a workspace;
   a scanner configured to identify the workpiece in the workspace;
   a robotic controller configured to control the manufacturing apparatus to perform a desired manufacturing process by executing a corresponding control program;
   a user interface configured to permit a user to identify, from a plurality of control programs, a desired control program for execution by the robotic controller;
   a process controller that is in communication with the robotic controller, the user interface, a data server that contains a plurality of control programs, and a manufacturing database that contains a plurality of work orders; wherein the process controller is configured to:
   receive the identification of the user-identified control program;
   identify the workpiece in the workspace using the scanner;
   retrieve a work order for the identified workpiece from the manufacturing database that specifies a designated control program for an appropriate manufacturing process for the identified workpiece; and
   validate whether or not the desired control program matches the designated control program.

2. The manufacturing system of claim 1, wherein the process controller is further configured so that if the desired control program does not match the designated control program, the process controller prevents execution of the desired control program and provides an alert to the user that the desired control program is incorrect.

3. The manufacturing system of claim 1, wherein the process controller is further configured so that if the desired control program matches the designated control program, the process controller sends the desired control program to the robotic controller for execution.

4. The manufacturing system of claim 1, wherein the scanner includes one or more of a camera, a barcode scanner, and an RFID scanner that is configured to detect identifying indicia associated with the workpiece positioned in the workspace.

5. The manufacturing system of claim 4, wherein the process controller is further configured to receive the detected identifying indicia and correlate the indicia with the identity of the workpiece.

6. The manufacturing system of claim 5, wherein the scanner is a camera configured to capture image data of the workpiece, and the process controller is configured correlate the image data with the identity of the workpiece using image recognition.

7. The manufacturing system of claim 5, wherein the scanner is an RFID scanner, and the RFID scanner is configured to detect an RFID tag associated with the workpiece, and the process controller is configured to correlate the RFID tag with the identity of the workpiece.

8. The manufacturing system of claim 5, wherein the scanner is a barcode scanner, and the barcode scanner is configured to read a barcode associated with the workpiece, and the process controller is configured to correlate the barcode with the identity of the workpiece.

9. The manufacturing system of claim 1, wherein the user interface is associated with the robotic controller.

10. A method for validating a control program for a manufacturing apparatus, comprising:
    receiving at a process controller user-input of an identification of a desired control program for a robotic controller of a manufacturing apparatus;
    receiving at the process controller an identification of a workpiece positioned within a workspace of the manufacturing apparatus;
    retrieving by the process controller from a database containing a plurality of work orders a work order for the identified workpiece that specifies a designated control program for an appropriate manufacturing process; and
    validating by the process controller whether or not the desired control program matches the designated control program;
    wherein when the desired control program does not match the designated control program, the method further comprises preventing an execution of the desired control program.

11. The method of claim 10, further comprising providing an alert to a user that the desired control program is incorrect.

12. The method of claim 11, wherein providing the alert includes generating a notification that the identified workpiece is at an inappropriate manufacturing apparatus, generating a notification that the desired control program is an inappropriate control program for the identified workpiece, and providing an identification of the designated control program for the identified workpiece.

13. The method of claim 10, wherein validating whether or not the desired control program matches the designated control program includes retrieving by the process controller the desired control program from a remote data server and comparing the desired control program with the designated control program.

14. The method of claim 10, wherein receiving an identification of a workpiece positioned within the workspace of the manufacturing apparatus includes detecting and interpreting an identifying indicium associated with the workpiece.

15. The method of claim 14, wherein detecting the identifying indicia includes one or more of capturing an image of the workpiece using a camera, detecting an RFID tag using an RFID scanner; and reading a barcode using a barcode scanner.

16. A computer program product, comprising:
at least one computer readable storage medium having computer readable program instructions embodied therewith, the computer readable program instructions, when read by a processor, being configured to:
receive user-input of an identification of a desired control program for a robotic controller of a manufacturing apparatus;
receive a scanner input of an identification of a workpiece positioned within a workspace of the manufacturing apparatus;
retrieve from a database containing a plurality of work orders a work order for the identified workpiece that designates a control program for an appropriate manufacturing process; and
determine whether or not the desired control program matches the designated control program, and responsive to a match generate an output for transmitting the desired control program to the robotic controller for execution, to thereby cause the robotic controller to control the manufacturing apparatus to perform a desired manufacturing process on the identified workpiece.

17. The computer program product of claim 16, wherein the computer readable program instructions, when read by the processor are further configured to prevent an execution of the desired control program when the desired control program fails to match the designated control program.

18. The computer program product of claim 17, wherein the computer readable program instructions, when read by the processor are further configured to provide an alert that the desired control program is incorrect.

19. The computer program product of claim 16, wherein the computer readable program instructions, when read by the processor are further configured to transmit the desired control program to the robotic controller for execution.

* * * * *